United States Patent
Kmetich et al.

(10) Patent No.: US 9,705,145 B2
(45) Date of Patent: Jul. 11, 2017

(54) HYDROGEN GENERATOR

(71) Applicant: Intelligent Energy Inc., San Jose, CA (US)

(72) Inventors: Thomas J. Kmetich, Wllloughby Hills, OH (US); Gerald A. Zsigo, North Ridgeville, CA (US); Alvin R. Mick, Lorain, OH (US); Harri Kytomaa, Belmont, MA (US)

(73) Assignee: Intelligent Energy Inc., San Jose, CA (US)

( * ) Notice: Subject to any disclaimer, the term of this patent is extended or adjusted under 35 U.S.C. 154(b) by 15 days.

(21) Appl. No.: 14/687,781

(22) Filed: Apr. 15, 2015

(65) Prior Publication Data

US 2016/0285118 A1    Sep. 29, 2016

Related U.S. Application Data

(63) Continuation of application No. PCT/US2013/053708, filed on Aug. 6, 2013.
(Continued)

(51) Int. Cl.
*H01M 8/06* (2016.01)
*B01J 19/24* (2006.01)
(Continued)

(52) U.S. Cl.
CPC ............. *H01M 8/065* (2013.01); *B01J 7/00* (2013.01); *B01J 8/009* (2013.01); *B01J 8/0285* (2013.01); *B01J 19/24* (2013.01); *C01B 3/0005* (2013.01); *C01B 3/04* (2013.01); *B01J 2208/00539* (2013.01); *B01J 2208/00884* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,940,474 A | | 2/1976 | Huskins et al. |
| 5,935,277 A | * | 8/1999 | Autenrieth ............... B01J 8/002 422/131 |

(Continued)

FOREIGN PATENT DOCUMENTS

| | | |
|---|---|---|
| EP | 0812802 | 12/1997 |
| EP | 1375419 | 1/2004 |

(Continued)

OTHER PUBLICATIONS

International Search Report dated Oct. 3, 2013, issued in International patent application PCT/US2013/053708.
(Continued)

*Primary Examiner* — Kaity Chandler
(74) *Attorney, Agent, or Firm* — Baker & Hostetler LLP

(57) ABSTRACT

A hydrogen generator and a fuel cell system including the hydrogen generator are disclosed. The hydrogen generator includes a fuel composition including a hydrogen containing material that releases hydrogen gas to produce hydrogen when heated. A biasing member working in cooperation with a heating element and retainer, all of which are disposed within a unitary container, facilitate and control the release of hydrogen gas. The fuel composition can be segregated into individual quantities.

18 Claims, 3 Drawing Sheets

US 9,705,145 B2

Page 2

Related U.S. Application Data

(60) Provisional application No. 61/716,635, filed on Oct. 22, 2012.

(51) Int. Cl.
*C01B 3/04* (2006.01)
*H01M 8/065* (2016.01)
*B01J 7/00* (2006.01)
*B01J 8/00* (2006.01)
*B01J 8/02* (2006.01)
*C01B 3/00* (2006.01)

(52) U.S. Cl.
CPC .......... *B01J 2219/00135* (2013.01); *B01J 2219/00155* (2013.01); *B01J 2219/24* (2013.01); *H01M 2250/30* (2013.01); *Y02B 90/18* (2013.01); *Y02E 60/324* (2013.01); *Y02E 60/364* (2013.01)

(56) References Cited

U.S. PATENT DOCUMENTS

| | | | |
|---|---|---|---|
| 5,953,922 A | 9/1999 | Stetson et al. | |
| 6,544,400 B2 | 4/2003 | Hockaday | |
| 6,749,702 B1* | 6/2004 | Knowlton | C06B 33/00 102/205 |
| 7,179,443 B2 | 2/2007 | Schell et al. | |
| 7,282,073 B2 | 10/2007 | Petillo | |
| 7,316,719 B2 | 1/2008 | Devos | |
| 7,867,441 B2* | 1/2011 | Eckels | F24J 1/00 422/411 |
| 7,964,111 B2* | 6/2011 | Perut | C01B 3/065 149/109.2 |
| 2001/0045364 A1* | 11/2001 | Hockaday | B01D 19/0031 205/338 |
| 2003/0138679 A1* | 7/2003 | Prased | B01J 8/025 429/421 |
| 2003/0235724 A1* | 12/2003 | Ord | C01B 3/065 422/129 |
| 2004/0048115 A1* | 3/2004 | Devos | B01J 7/02 48/197 R |
| 2004/0214056 A1* | 10/2004 | Gore | C01B 3/065 429/421 |
| 2005/0244683 A1 | 11/2005 | Otis et al. | |
| 2007/0020172 A1* | 1/2007 | Withers-Kirby | C01B 3/065 423/648.1 |
| 2007/0036711 A1 | 2/2007 | Fisher | |
| 2008/0014481 A1 | 1/2008 | Fiebig | |
| 2008/0236032 A1* | 10/2008 | Kelly | C01B 3/02 44/628 |
| 2008/0241613 A1* | 10/2008 | Kelly | C01B 3/02 429/421 |
| 2009/0101520 A1 | 4/2009 | Zhang et al. | |
| 2009/0104481 A1 | 4/2009 | Mohring et al. | |
| 2011/0027168 A1* | 2/2011 | Yvart | C01B 3/065 423/648.1 |
| 2011/0120008 A1 | 5/2011 | Curello | |

FOREIGN PATENT DOCUMENTS

| | | |
|---|---|---|
| EP | 1396471 | 3/2004 |
| GB | 2465313 | 5/2010 |

OTHER PUBLICATIONS

Diwan et al.; "Combustion wave propagation in magnesium/water mixtures: Experiments and model"; Chemical Engineering Science; vol. 65 Issue 1; Jan. 2010; p. 80-87.

Shafirovich et al.; "Combustion-assisted hydrolysis of sodium borohydride for hydrogen generation"; Int'l Journal of Hydrogen Energy; vol. 32 Issue 2; Feb. 2007; p. 207-211.

* cited by examiner

HYDROGEN GENERATOR

CROSS-REFERENCE TO RELATED APPLICATIONS

This patent application is a Continuation of international patent application PCT/US2013/053708 filed Aug. 6, 2013, which claims priority to Provisional patent application 61/716,635 filed Oct. 22, 2012, the disclosures of which are incorporated by reference in their entirety.

TECHNICAL FIELD

The present invention generally relates to a hydrogen gas generator, and more particularly relates to a hydrogen generator for providing hydrogen gas to a fuel cell system.

BACKGROUND

Interest in fuel cell batteries as power sources for portable electronic devices has grown. A fuel cell is an electrochemical cell that uses materials from outside the cell as the active materials for the positive and negative electrodes. Because a fuel cell does not have to contain all of the active materials used to generate electricity, the fuel cell can be made with a small volume relative to the amount of electrical energy produced compared to other types of batteries.

Fuel cells can be categorized according to the type of electrolyte used, typically one of five types: proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these types of fuel cell can use hydrogen and oxygen as the active materials of the fuel cell negative electrode (anode) and positive electrode (cathode), respectively. Hydrogen is oxidized at the negative electrode, and oxygen is reduced at the positive electrode. Ions pass through an electrically nonconductive, ion permeable separator and electrons pass through an external circuit to provide an electric current.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (such as a fuel cell stack), and a hydrogen source, such as a fuel tank, a hydrogen tank or a hydrogen gas generator. Gas generators that supply gas to a fuel cell can be an integral part of the fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

Hydrogen generators can provide hydrogen from a variety of hydrogen containing materials and a variety of methods for initiating the release of hydrogen. Examples of hydrogen containing materials include liquid or gaseous hydrocarbons (such as methanol), hydrides (such as metal hydrides and chemical hydrides), alkali metal silicides, metal/silica gels, water, alcohols, dilute acids and organic fuels (such as N-ethylcarbazon and perhydrofluorene). A hydrogen containing compound can react with another reactant to produce hydrogen gas when the reactants are mixed together, in the presence of a catalyst, heat or an acid, or a combination thereof.

In selecting reactants for use in a hydrogen generator, consideration may be given to the following: (a) stability during long periods of time when the hydrogen generator is not in use, (b) ease of initiation of hydrogen release (c) the amount of energy that must be provided to sustain the release of hydrogen, (d) the maximum operating temperature, and (e) the total volume of hydrogen that can be produced per unit of volume and per unit of mass of thehydrogen-containing material(s).

Some hydrogen containing materials can be heated to evolve hydrogen in a chemical decomposition reaction. A hydrogen generator using such types of materials can be advantageous with regard to the volume of hydrogen that can be produced compared to other types of hydrogen generators, such as those with a liquid reactant.

An object of the present invention is to provide a hydrogen generator with one or more of the following features: a self-contained assembly including all necessary elements contained within a structure that is easily incorporated into a fuel cell system and/or which serves as a fungible fuel source therefor; an assembly which only selectively generates hydrogen; and an assembly which accommodates and segregates the reaction byproducts within a unitary reaction chamber.

SUMMARY

In one aspect of the invention, there is provided a hydrogen generator having a reaction chamber containing a fuel including a hydrogen containing material capable of releasing hydrogen gas when heated. The reaction chamber includes an outlet for removal of hydrogen gas, a biasing member, a heating element and a retainer configured to permit egress of spent fuel therethrough. The biasing member is positioned to maintain constant contact between the fuel and at least one of the heating element and the retainer. The retainer bisects the reaction chamber so that the biasing member and fuel are disposed on opposite sides of the retainer, and the biasing member, heating element and retainer are wholly contained within the reaction chamber.

Additional or further embodiments can include any combination of the following features:
the heating element is integrally formed with one of the retainer and the biasing member;
the retainer includes a screen;
the biasing member includes a screen;
the hydrogen generator includes a hollow tube within the reaction chamber to facilitate transport of hydrogen gas to the outlet; the hollow tube can act as a guide for the biasing member; the biasing member can be positioned around an outer surface of the hollow tube or can be encased within the hollow tube; the hollow tube is located along a central axis of the reaction chamber, with the fuel occupying an annular space defined by an outer wall of the hollow tube and in inner wall of the reaction chamber;
the fuel is disposed on a substrate; the substrate can include at least one of the retainer and a detachable wall element of the reaction chamber;
the fuel includes a plurality of fuel elements; the plurality of fuel elements can include a plurality of fuel discs; the plurality of fuel discs can include a stack of fuel discs with a thermal insulator disposed between adjacent fuel discs;

the reaction chamber includes a plurality of subchambers, each having a biasing member, a retainer and a heating element;

the fuel, the retainer the heating element and the biasing element are all contained within a removable cartridge that is inserted into the reaction chamber;

the heating element is a resistive heating element; and the biasing member exerts compressive force on the retainer in response to heat provided by the heating element.

DETAILED DESCRIPTION

Figure 1:
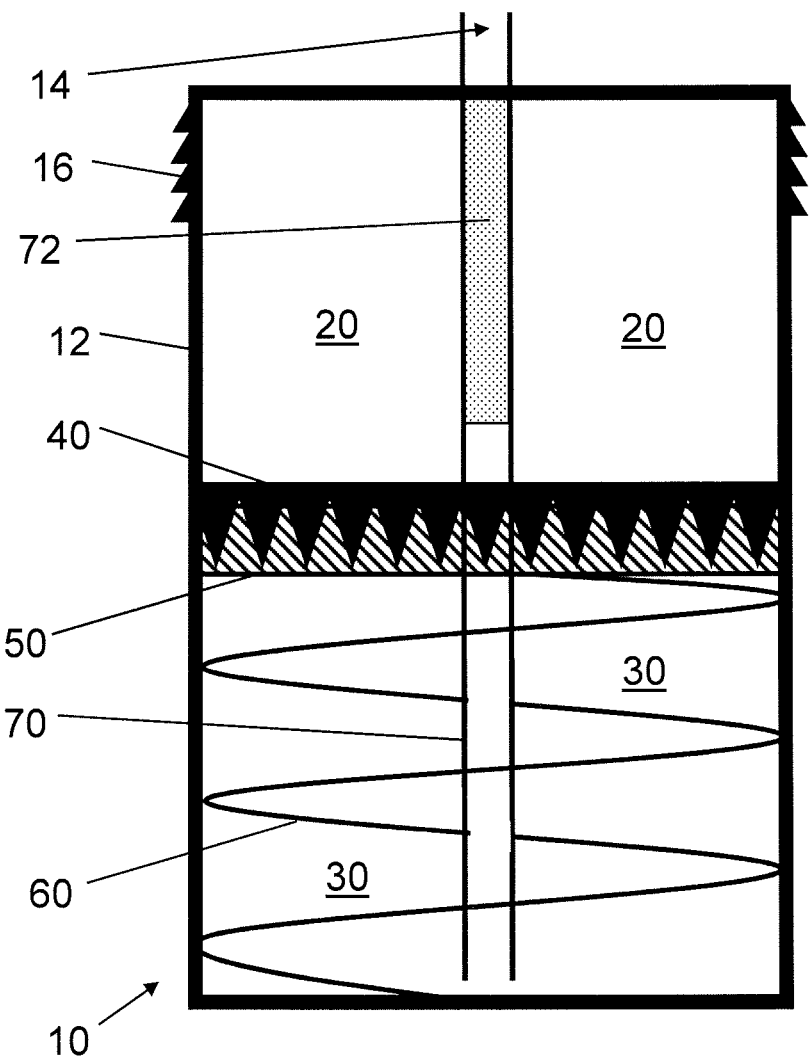
FIG. 1 is a cross-sectional view of an embodiment of a hydrogen generator.

The above objects are accomplished by the present invention, which is directed to a hydrogen generator. The present invention is further directed to a hydrogen generator adapted for use in a fuel cell system including a fuel cell battery (which may be referred to below as a fuel cell or fuel cell stack, whether it contains one or a plurality of fuel cells or fuel cell batteries). Specifically, the hydrogen generator produces hydrogen gas that is consumed by a hydrogen consuming apparatus such as a fuel cell battery. The fuel cell battery can provide electricity to an electronic device. In a preferred embodiment, the hydrogen generator may be portable, either alone or as part of the fuel cell system or the device. As used herein, portable means a fungible unit of appropriate size and weight that can be readily and easily removed and replaced by an individual person, without special training or equipment.

The hydrogen generator includes a fuel composition containing one or more hydrogen containing materials (which can be referred to below as fuels) that can release hydrogen gas when heated. In order to economically produce a large volume of hydrogen gas per unit relative to its volume and weight, it is advantageous to use a reactant that can undergo a thermal decomposition reaction that produces hydrogen gas when heated. Such thermal decomposition reactions can often produce a larger volume of gas per unit of reactant than, for example, the same amount (per mole, per unit of weight or per unit of volume) of reactants that undergo a hydrolysis reaction. Preferred reactants do not require costly catalysts to undergo the desired hydrogen-generating reactions.

Aluminum hydride ($AlH_3$ or alane) is a preferred thermal decomposition fuel. Alane undergoes a controllable thermolysis reaction when exposed to sufficient heat, thereby producing hydrogen gas and solid, environmentally begign reactant products (including metallic aluminum). Alane is advantageous because it is relatively dense and its thermal decomposition temperature is relatively low. Up to about 2 to 3 weight percent of polypropylene can be included as a binder. Other thermal decomposition fuels that may be suitable for additional embodiments include metal and/or other hydrides which undergo a thermolysis reaction when heated, without a catalyst being present. The fuels compatible with the hydrogen generator contemplated herein may be provided as pellets, powders, annular disks, flat plates or unitary bodies that will fit within the reaction container described below. In certain embodiments, insulating dividers may be positioned within, around or between portions of the fuel The fuel composition contains at least one hydrogen containing material, or fuel, that can release hydrogen gas when heated. More than one fuel can be included. Examples include materials that can reversibly absorb and desorb hydrogen (e.g., metal-organic frameworks (MOFs), zeolites, graphene, carbon nanotubes and metal hydrides as $AB_5$ and $AB_2$ type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B—N chemical hydrides such ammonia borane and hydrazine borane), and various combinations including the above materials. Choices of fuels may be limited by other factors such as physical and chemical properties of the reactant, the type of initiation system being used, the temperature range for the desired thermal decomposition reaction, whether the hydrogen-generating reaction is exothermic or endothermic, the composition, form and properties of reaction byproducts, and so on.

The fuel composition can also contain one or more additives. Examples of additives include binders (e.g., acrylates, styrene block copolymers, polypropylene and polytetrafluoroethylene), stabilizing materials (e.g., air and/or water impermeable materials such as polypropylene, polyethylene, polyetheretherketone and nonporous ceramics), thermally conductive materials (e.g., metals, graphites and combinations and composites thereof), and ignition materials as described below. Additional layers can be used in combination with a layer of fuel composition, such as layers of stabilizing, thermally conductive, and thermally insulating materials. When a coating layer is applied over the fuel composition, provision must be made for the release of hydrogen gas as it is being produced (e.g., through or around the coating layer or through a substrate on which the fuel composition is disposed). Preferably catalysts are not included in the fuel composition or elsewhere within the hydrogen generator to catalyze the release of hydrogen.

The reaction composition can be present in various forms. For example, it can be in powdered or granular form, formed into discrete bodies such as pellets or discs, or disposed on a substrate. The fuel composition can be applied to a substrate by any suitable method, such as spraying, printing, roll coating, extruding, adhesive laminating and pressure laminating. Coatings or layers of other materials can be combined with the fuel composition, e.g., to provide protection from ambient air and moisture, to provide improved processing, or to provide thermal insulation of individual quantities of the fuel composition.

It may be desirable to include an ignition material within the assembly, especially if the fuel composition includes a reactant that is endothermic (e.g., alane) or another type of fuel that will not undergo a self-sustaining release of hydrogen. An ignition material reacts exothermically when heated and can be used in conjunction with the initiation system to provide heat to initiate the release of hydrogen by the fuel. An ignition material can provide a number of advantages. The temperature to which the ignition material must be heated to react may be lower than the minimum temperature to which the fuel must be heated, reducing the heat producing requirement for the initiation system. Because the ignition material reacts exothermically, it can reduce the total amount of energy that must be supplied to the initiator during use of the hydrogen generator, particularly if the release of hydrogen gas is endothermic. An ignition material can be an ingredient of the fuel composition, or it can be in a coating, a separate layer or other mass in contact with or adjacent to the fuel composition. Some types of ignition materials can also produce hydrogen gas when they react, contributing to the total amount of hydrogen the hydrogen generator can provide. Examples of ignition materials include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749, 702, complex hydride, oxidizer, and S compositions such as described in U.S. Pat. No. 7,964,111, and the compositions described in patents US2008/0236032A1 and US 2008/0241613A1. Other compositions include gels of metals and water such as Mg/water/poly(acrylamide-co-acrylic acid) alone or in combination with sodium borohydride (Varma, etal. *Chem. Eng. Sci* 2010, 65, 80-87 and *Int. J Hydrogen En* 2007, 32, 207-211, respectively). When used in a hydrogen generator, it can be advantageous if the exo fuel produces hydrogen, thereby increasing the total volume of hydrogen gas provided. It will be understood that references herein to initiating the release of hydrogen by a hydrogen containing material can include initiating a heat generating reaction in an ignition material that in turn initiates the release of hydrogen.

The release of hydrogen may be triggered by any appropriate heat source. In one embodiment, a resistive element such as metallic mesh or radiantly conductive mesh connected to an appropriate electrical source can be used. Other embodiments contemplate other chemical, electromagnetic or other exothermic processes which provide sufficient thermal energy to initiate the release of hydrogen. Preferably, the heat source is activated and controlled by electrical current.

The heat source is brought into thermal communication with the fuel by means of a biasing member. This thermal communication may be direct physical contact or indirect contact through an intermediate thermally conductive component or material. The biasing member is preferably a passive (unpowered) member such as a spring, positioned within the container, which exerts force to maintain thermal communication between the heating element and the fuel. In some embodiments, the heat source operates in conjunction with the biasing member to exert biasing force on a selective basis. For example, the biasing member may move in response to heat or electricity generated by or provided to the heating element, thereby insuring the heat source stays in contact with the fuel to sustain the thermolysis reaction. Examples of such biasing members include bimetallic and positive temperature coefficient devices that can change shape as their temperature changes. In other embodiments, the biasing member exerts compressive force to maintain the positioning of the elements within the container.

The biasing member is coupled to a retainer, as will be described in greater detail below, and/or to the heat source. In some embodiments, the heat source may be integrated with the biasing element. In other embodiments, the heat source may be integrated with the retainer (e.g., in the form of screen, mesh or other body containing sufficient apertures to permit reaction byproducts to pass therethrough).

A retainer divides the interior of the container to segrate the fuel from the spent fuel (e.g., reaction byproducts). Additionally, the retainer cooperates with the biasing member and/or heating element to insure the thermal communication necessary to sustain the release of hydrogen. The retainer also contains apertures sufficient to permit spent fuel to pass through the retainer and the heating element in order to achieve the desired segregation. In some embodiments, the retainer is integrated with the heating element. For example, an integrated retainer and heating element may take the form of a metallic mesh or screen that can function as a heating element. In embodiments in which the retainer is disposed between the heating element and the fuel, the retainer can provide thermal communication between the heating element and the fuel by conducting heat from the heating element to the fuel.

To the extent the fuel composition is provided in layers with insulation between each layer, the biasing member can operate in a manner that positions the heating element immediately adjacent to the fuel so that the fuel in that layer is consumed. In such cases, the biasing element can be attached to both a centally disposed heating element, preferably within a hydrogen conduit, whereas the retainer can extend annularly around the heater and exert the required force on the layers of fuel to keep the layers properly positioned.

Significantly, all of the aforementioned elements are contained within a single vessel or container. That is, the heating element, the fuel, the retainer and the biasing element are all constrained within the container itself. The retainer serves to bisect the interior of the container into two distinct areas, with the fuel in one area (the fuel area) and an initially void space for spent fuel in the other area (the spent fuel area). By action of the biasing member, the spent fuel area increases in volume as spent fuel passes through the retainer and the overall volume required by the fuel (and, by extension, the fuel area) decreases. In this manner, the aforementioned elements, along with any and all reaction byproducts, remain wholly contained within the assembly container. When the fuel in the assembly is fully spent, the container may be decoupled from the fuel cell battery and replaced with an identical hydrogen generator.

The container is configured to withstand the tempertures of the thermolysis reaction and provided with sufficient insulation to avoid damaging the constituent components of the fuel cell battery and to permit a user to safely handle the hydrogen generator assembly itself In some embodiments, the container may be encased or provided with an exterior housing. Both the housing and the container must have sufficient mechanical strength and resistance to the conditions to which the hydrogen generator is expected to be exposed, particularly to high temperatures, and the hydrogen containing materials and byproducts associated with the hydrogen release. The housing can include an access lid, door, panel or the like that can be opened or removed to allow insertion and replacement of one or more hydrogen generating assemblies. Opening of the lid can be controlled, such as to prevent removal of hot cartridges. For example, the lid can be clasped by a latch made from a material having sufficient thermal expansion so as to prevent opening of the lid when the material exceeds a specific temperature.

Suitable materials for the housing and/or the container can include metals such as aluminum, steel and stainless steel; ceramics; high temperature resistant polymers such as polyphenylene sulfide, acrylonitrile butadiene styrene, polyetheretherketone, polyetherimide, polyoxybenzylmethylenglycol anhydride (Bakelite®); epoxies; phenolics; diallyl phthalate; melamine; fiberglass filled composites; and alloys, mixtures and composites (e.g., laminates) thereof. In some embodiments the holder may be made from a material that is a poor thermal conductor (e.g., less than 10 watts/meter·Kelvin and preferably less than 1 watt/meter·Kelvin) to protect the rest of the fuel cell system, the device and/or the user from heat produced within the hydrogen generator. If desired, thermal insulation can be added to the hydrogen generator, within the housing, around the housing or elsewhere in the fuel cell system or the device. A vacuum, such as in a hollow space in a wall(s) of the holder, can provide thermal insulation, and materials such as aerogels, fiberglass, rock wool, vermiculite and foam plastics can be used to provide thermal insulation.

The container and/or housing can contain a limited quantity of hydrogen gas under pressure. To avoid special requirements for a high pressure container, it is desirable to design the hydrogen generator to limit the amount of hydrogen gas that must be contained. If internal pressure can build up during operation of the hydrogen generator, it may be desirable to include a pressure relief vent in the housing to release gas before the pressure gets too high (i.e., to prevent an uncontrolled opening or rupture of the housing).

The container or housing may include one or more cavities or subchambers into which cartridges can be removably inserted. Each cartridge so provided includes the features necessary to sustain hydrogen release within the cartridge (i.e., fuel, heating element, biasing element and retainer), although it is possible to engineer the overall assembly to allow certain elements to be shared or integrated across multiple chambers.

Fuel may be disposed witin the container during its manufacture, or one or more cartridges can be inserted into a corresponding cavity or cavities in the container. In one embodiment, fuel composition is disposed on a substrate. The substrate is received by, or more preferably, integrally forms a portion of one of the walls of the container. In the event that multiple cavities are provided within the container, the fuel compositions are aligned on the substrate so that fuel is provided to each cavity. In some embodiments contemplating multiple cavities, the substrate may also be provided with additional elements of the hydrogen generating assembly, including but not limited to any of: the heating element, the biasing element, the retainer, and the hydrogen outlet.

In some embodiments, the substrate is preferably a rigid material that is stable at the expected reaction temperatures. It should not deform (e.g., by melting, shrinking or warping) to the extent that operation of the hydrogen generator or removal of a fuel containing cartridge from the container is adversely affected, and it should not deteriorate when in contact with the reaction composition or when heated to produce reaction products that can damage the hydrogen consuming apparatus. Thermoplastics such as polycarbonates, polyetheretherketone, polyimides, polyamideimides, polyetherimide, polysulphones, polyether sulphone, polypheylene sulphide, liquid crystal polymers and composites (e.g., glass or carbon filled, laminated with another thermoplastic, or a metal such as a steel or aluminum) thereof are examples of materials that may be suitable, depending on the maximum operating temperature. If the substrate includes a polymer, the glass transition temperature is preferably less than the maximum operating temperature.

In other embodiments the substrate can be another component of the hydrogen generator besides the container. For example, the retainer or thermally insulating material separating layers of the fuel composition can be a substrate on which the fuel composition is disposed. In some of these examples the substrate is not necessarily a rigid material.

In some embodiments it may be desirable for the a substrate on which fuel composition is deposited or layers, coatings and the like disposed on or adjacent to fuel composition to deteriorate during use of the hydrogen generator. This can allow such materials to move along with spent fuel into the spent fuel area of the hydrogen generator, thereby exposing fresh fuel to the heating element.

In yet other embodiments the fuel composition is not formed on a substrate but contained as pellets, discs, etc. within the fuel area of the hydrogen generator.

Hydrogen gas produced in the hydrogen generator flows through a hydrogen flow path to an outlet that interfaces with the rest of the fuel cell system. The hydrogen generator can also include various fittings, valves and electrical connections for providing hydrogen to and interfacing with the fuel cell battery and/or an electrical appliance being provided with power by the fuel cell system. It may be desirable to provide one or more filters or purification units (referred to as filters below) in the hydrogen flow path to remove solid or fluid byproducts (such as fuel cell poisons) and/or unreacted reactant from the hydrogen. Filters can be located within the fuel assembly and/or at the interface between the hydrogen generator and the rest of the fuel cell system. It may be desirable to provide access for periodically replacing filters located outside the container. Examples of materials that may be suitable for filters include silica, silicon dioxide, silicon nitrides, silicon carbide, silica aerogel, alumina, aluminum oxide, glass, glass wool, mineral wool, cellular glass, perlite and polymers such as polyimides and epoxyamine composites, as well as suitable gas purification units (such as ion exchange resins). It may be possible to position filters so they also provide thermal insulation.

In order to provide hydrogen gas on an as-needed basis without developing a high internal pressure within the hydrogen generator, it can be advantageous to be able to react limited quantities of fuel. In embodiments in which the hydrogen release is not self-sustaining after initiation, hydrogen release can be stopped by merely turning off the heating element and allowing the reaction composition to cool. Segregating limited quantities of fuel composition can also improve the reaction efficiency. In embodiments in which the hydrogen release is self-sustaining (consuming essentially all the fuel in a quantity of fuel composition once hydrogen release is initiated), the amount of fuel that can be used as a result of a single initiation event can be limited by segregating quantities of fuel composition. Segregation can be accomplished by positioning gaps, ridges in the substrate disc, thermally insulating materials and combinations thereof between quantities of the fuel composition for example.

A control system can be used to control the supply of energy from a source to the heating element, such as by turning the initiator on and off or by adjusting the power level. It can also be used to control the operation of the biasing element in embodiments in which the biasing element expands or changes shape based upon the application of current and/or heat.

The control system can determine the need for hydrogen and/or the required hydrogen flow rate by monitoring parameters of the hydrogen generator, the remainder of the fuel cell system and the electronic device being supplied with power by the fuel cell battery. The parameters can include any one or combination of the pressure within the fuel cell system, one or more electrical characteristics of the fuel cell battery, or one or more electrical characteristics of the electronic device, for example. The controller may communicate with the device or the fuel cell battery to determine when more hydrogen is needed. The control system can monitor and manage temperatures of the hydrogen generator, the fuel cell system and the device. Portions of the control system can be disposed in the hydrogen generator, the fuel cell battery, the electronic device being powered by the fuel cell battery, or any combination thereof. The control system can include a microprocessor or microcontroller; digital, analog and/or hybrid circuitry; solid state and/or electromechanical switching devices; capacitors, sensing instrumentation, timers and so on. The same or a different control system can also be used for other purposes, such as identifying hydrogen generators and cartridges that are appropriate or approved for use, preventing use of inappropriate or unapproved hydrogen generators and cartridges, controlling charging of batteries in the fuel cell system and the device by the fuel cell battery, calculating and providing information on the remaining capacity of the hydrogen generator or cartridge(s), recording historical information regarding the use of the cartridge(s), the hydrogen generator, the fuel cell system and the device, preventing operation of the hydrogen generator under unsafe conditions, and other purposes.

Alternatively, the biasing member itself may be engineered to act as a hydrogen control system. For example, the biasing member may be a spring selected to have sufficient compressive force to move the mass of fuel and components within the cell but limited so that it fails to maintain contact between the heating element and the fuel if hydrogen gas pressure exceeds a certain amount.

Energy for the heating element(s) of an exemplary hydrogen generator can be supplied from outside the hydrogen generator via electrical contacts and circuitry. The energy source can be one or a combination of a rechargeable battery (e.g., nickel-cadmium or nickel-metal hydride batteries) and a direct current to direct current converter located in the fuel cell system, for example. The battery can be recharged by the fuel cell battery during operation of the fuel cell system. If necessary the battery can be recharged from an external source if the battery is not sufficiently charged for startup of the hydrogen generator.

Operation of an exemplary hydrogen generator can be controlled by a control system. When there is a load on the fuel cell system, a control system sensor can monitor the hydrogen pressure in the fuel cell system; if the pressure is below a minimum level, power is supplied to the heating element, and if the pressure is above a maximum level, no power is supplied. If the hydrogen generator is not providing sufficient hydrogen gas to maintain the hydrogen pressure within the desired range, the control system can provide power to the heating element and/or biasing member. The control system may include a temperature sensor and/or may control a lid interlock.

Hydrogen gas exits an exemplary hydrogen generator through a valve in a wall of the holder. The fuel cell system may also include a purge pump for purging air from the system before hydrogen gas is supplied to the fuel cell battery. The intended maximum hydrogen pressure within the hydrogen generator will be dictated by the design of the fuel cell battery and the strength of the container (both in terms of its form factor and physical composition). A pressure relief vent may be included in the hydrogen generator to release excessive pressure and prevent an uncontrolled release. Additional filter material and baffles can be included in the container cavity, e.g., between the cartridge and the hydrogen outlet valve.

One embodiment of the invention is depicted diagrammatically in FIG. 1. The hydrogen generator 10 includes a container 12. An hydrogen outlet 14 is disposed at one end of the container 10. The exterior of the hydrogen generator 10 may contain implements, such as threads 16, to facilitate coupling the container 12 to a larger fuel cell battery or system (not shown).

The interior volume of the container 10 is generally split into two areas, the fuel area 20 and the spent fuel area 30. The areas 20, 30 are divided by retainer 40. Heating element 50 is positioned proximate to the retainer 40. The retainer 40 and heating element 50 may be integrated as a single element, for example as a wire screen capable of producing resistive heat. Alternatively, retainer 40 and element 50 may move independent of one another. Retention grooves or protrusions (not shown) may be formed along the interior of the container 12 to insure that, once the retainer 40 and/or heating element 50 is/are pushed a certain point, these elements 40, 50 cannot and will not subsequently slide out of position, irrespective of the action of biasing member 60.

Biasing member 60 may be provided in the form of a compressive spring. Biasing member 60 cooperates with the holding retainer 40 and/or heating element 50 to insure contact or immediate adjacency is maintained with the fuel composition present in fuel area 20. Notably, fuel may be provided as pellets, although other forms are possible. Fuel will comprise the hydrogen containing materials noted above.

Biasing member 60 may be wrapped around or otherwise cooperate with hydrogen conduit 70 so hydrogen conduit 70 effectively acts as a guide to further control the movement of the holding retainer 40 and the heating element 50 in response to force exerted by the biasing member 60. In other embodiments, one or both of the biasing member 60 and the heating element 50 may be contained inside of the conduit 70. Optional hydrogen gas filter 72 may also be provided within conduit 70 to insure that hydrogen gas provided by the assembly 10 is of sufficient purity or quality to meet its intended purpose. Preferably, conduit 70 is free from other obstructions, so that the remaining elements (including the fuel) are positioned annularly around the conduit 70. Conduit 70 may be provided with inlets along its length to allow for more efficient hydrogen gas collection and transport.

Retainer 40 has sufficient apertures to permit spent fuel to pass from fuel area 20 into spent fuel area 30.

Figure 2A:
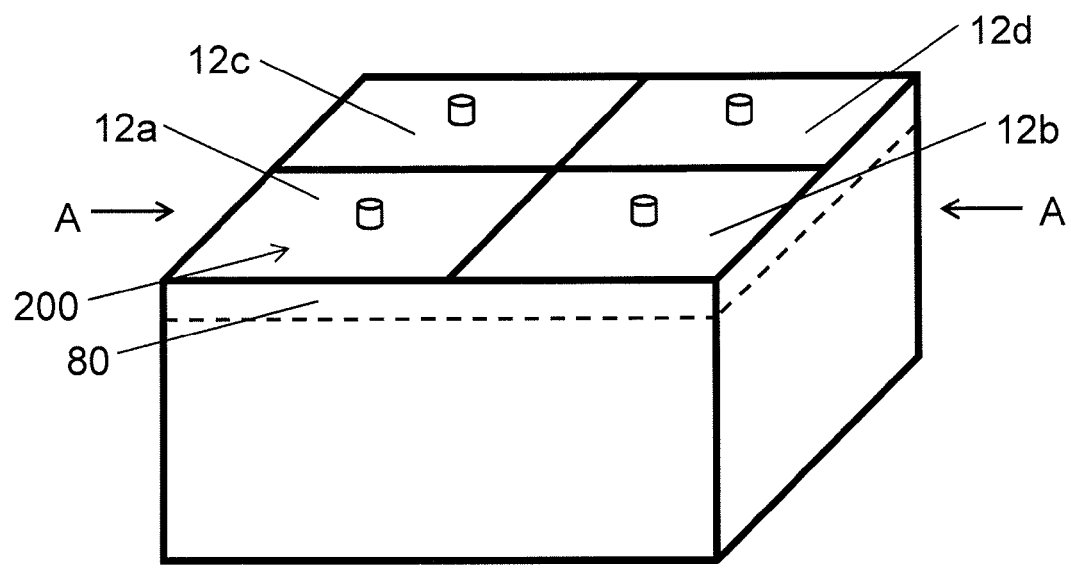
FIG. 2A is a perspective view of a second embodiment of a hydrogen generator.

In a separate embodiment of assembly 200 shown in a diagrammatic perspective in FIG. 2A, housing 13 is divided into a plurality of cavities or subchambers 12a, 12b, 12c, 12d. Each subchamber may contain the same elements as the embodiment illustrated in FIG. 1, and the use of any common reference numerals throughout this specification should be understood to denote the same.

Housing 13 further receives fuel, such as in a fuel composition disposed on a fuel substrate member 80, though the fuel can be in other forms as disclosed above. In effect, substrate member 80 can act as a cover or closure to insure the proper sealing of subchambers 12*a*, 12*b*, 12*c*, 12*d*. Member 80 further includes appropriate outlets 14 for each subchamber. Fuel is disposed on substrate 80 so that, when it is fitted to seal the housing 13 and individual subchambers 12*a*, 12*b*, 12*c*, 12*d* provided therein, fuel is properly disposed within and provided to each of the fuel areas 20 found in those subchambers. Although 4 subchambers are shown, any number may be possible. As above, means for facilitating connection to a fuel cell battery may be disposed within or on the housing 13 or otherwise provided to the assembly 200.

Figure 2B:
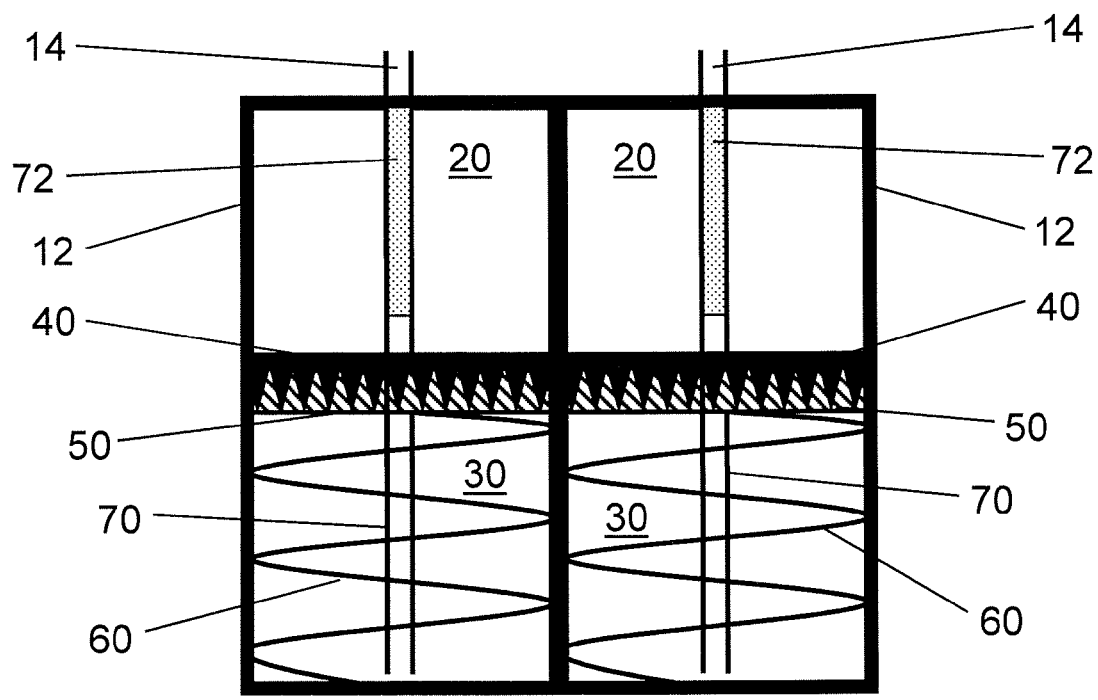
FIG. 2B is a cross-sectional view of the second embodiment of a hydrogen generator, taken along line A-A in FIG. 2A.

FIG. 2B is cross sectional illustration taken along line A-A in FIG. 2A. Although not shown, certain other embodiments may utilize certain elements, such as retainer 40, heating element 50 and/or biasing member 60, across a plurality of the subchambers rather than having individual components provided to each subchamber as shown in FIG. 2B.

Figure 3:
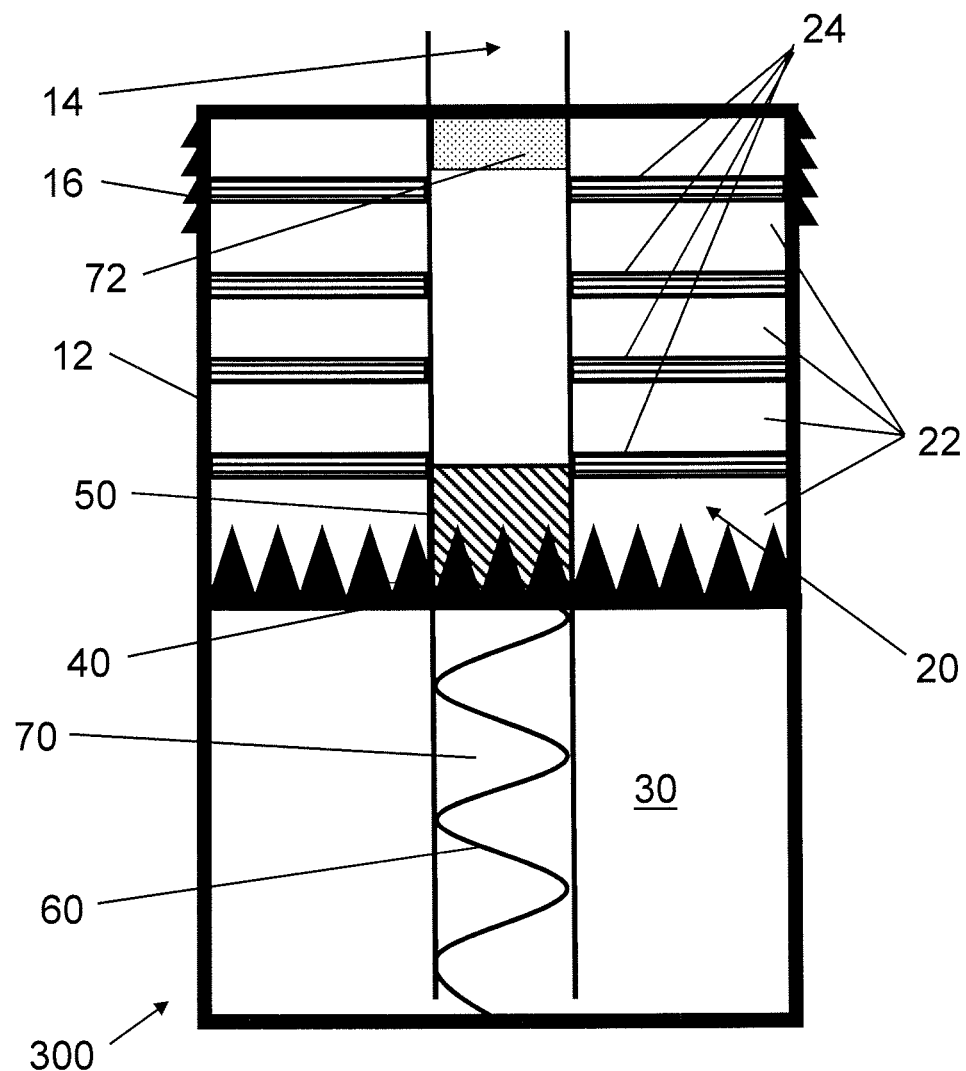
FIG. 3 is an cross-sectional view of a third embodiment of a hydrogen generator.

In still a further embodiment of assembly 300 shown in diagrammatic cross section in FIG. 3, the biasing member 60 and heating element 50 are provided inside of conduit 70. This configuration allows for more discrete and controlled movement of the heating element 50. Retainer 40 may still be operatively connected to move in concerted with the heating element 50 even though the retainer 40 is provided outside of the conduit 70.

In the illustrated embodiment in FIG. 3, fuel area 20 has a stack of fuel pellets 22. Each discrete pellet 22 is separated by an insulating disk 24. The control means (not shown) may be configured so that the biasing member 60 positions the heating element 50 proximate to each layer of fuel 22. Alternatively or additionally, grooves or protrusions (not shown) may be formed along the inner and/or outer surface of conduit 70 to facilitate and guide the positioning of the heating element 50. Although not illustrated, assembly 300 may be incorporated into one or all of the subchambers 12*a*, 12*b*, 12*c*, 12*d* as envisioned in FIG. 2A above.

In hydrogen generators using the exemplary assemblies described above, the hydrogen generator is part of a fuel cell system that contains a fuel cell stack that can provide electric energy to power an electronic device.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

We claim:

1. A hydrogen generator for a fuel cell comprising:
a reaction chamber containing a fuel comprising a hydrogen containing material capable of releasing hydrogen gas when heated, said reaction chamber having an outlet for removal of hydrogen gas, a biasing member, a heating element and a retainer configured to permit egress of spent fuel there through;
wherein the biasing member is positioned to maintain constant contact between the fuel and at least one of the heating element and the retainer;
wherein the retainer bisects the reaction chamber so that the biasing member and fuel are disposed on opposite sides of the retainer;
wherein the biasing member, heating element and retainer are wholly contained within the reaction chamber;
wherein the reaction chamber further comprises a hollow tube located along a central axis of the reaction chamber and configured to facilitate transport of hydrogen gas to the outlet, the hollow tube provided with inlets along its length for hydrogen gas collection and transport;
wherein the biasing member is configured to cooperate with the hollow tube by being wrapped around an outer surface of the hollow tube or by being encased within the hollow tube, so that the hollow tube effectively acts as a guide to further control the movement of the retainer and the heating element in response to force exerted by the biasing member; and
wherein the reaction chamber further comprises retention grooves or protrusions formed along the interior of the reaction chamber, the retention grooves or protrusions configured such that, once the retainer, the heating element, or both are pushed to a retention position, the retainer, the heating element, or both are prevented from sliding out of the retention position, irrespective of the action of the biasing member.

2. The hydrogen generator according to claim 1, wherein the heating element is integrally formed with one of the retainer and the biasing member.

3. The hydrogen generator according to claim 1, wherein the retainer comprises a screen.

4. The hydrogen generator according to claim 1, wherein the biasing member comprises a spring.

5. The hydrogen generator according to claim 1, wherein the biasing member is configured to cooperate with the hollow tube by being wrapped around an outer surface of the hollow tube.

6. The hydrogen generator according to claim 1, wherein the biasing member is configured to cooperate with the hollow tube by being encased within the hollow tube.

7. The hydrogen generator according to claim 1, wherein the fuel occupies an annular space defined by an outer wall of the hollow tube and an inner wall of the reaction chamber.

8. The hydrogen generator according to claim 1, wherein the fuel is disposed on a substrate.

9. The hydrogen generator according to claim 8, wherein the substrate comprises at least one of the retainer and a detachable wall element of the reaction chamber.

10. The hydrogen generator according to claim 1, wherein the fuel comprises a plurality of fuel elements.

11. The hydrogen generator according to claim 10, wherein the plurality of fuel elements comprises a plurality of fuel pellets.

12. The hydrogen generator according to claim 11, wherein the plurality of fuel elements comprises a plurality of fuel discs.

13. The hydrogen generator according to claim 12, wherein the plurality of fuel discs comprises a stack of fuel discs with a thermal insulator is disposed between adjacent fuel discs.

14. The hydrogen generator according claim 1, wherein the reaction chamber comprises a plurality of sub chambers, each having a biasing member, a retainer and a heating element.

15. The hydrogen generator according to claim 1, wherein the fuel, the retainer, the heating element and the biasing element are all contained within a removable cartridge that is inserted into the reaction chamber.

16. The hydrogen generator according to claim 1, wherein the heating element is a resistive heating element.

17. The hydrogen generator according to claim 1, wherein the biasing member exerts compressive force on the retainer in response to heat provided by the heating element.

18. The hydrogen generator according to claim 1, wherein the biasing member comprises a bimetallic or positive temperature coefficient device configured to change shape as its temperature changes.

* * * * *